United States Patent
Lewis et al.

(10) Patent No.: US 11,042,383 B2
(45) Date of Patent: Jun. 22, 2021

(54) SYSTEM AND METHOD FOR BOOT SPEED OPTIMIZATION USING NON-VOLATILE DUAL IN-LINE MEMORY MODULES

(71) Applicant: Insyde Software Corp., Taipei (TW)

(72) Inventors: Timothy Andrew Lewis, El Dorado Hills, CA (US); Trevor Western, Sudbury, MA (US)

(73) Assignee: Insyde Software Corp., Taipei (TW)

( * ) Notice: Subject to any disclaimer, the term of this patent is extended or adjusted under 35 U.S.C. 154(b) by 31 days.

(21) Appl. No.: 16/266,093

(22) Filed: Feb. 3, 2019

(65) Prior Publication Data
US 2019/0243659 A1 Aug. 8, 2019

Related U.S. Application Data

(60) Provisional application No. 62/626,038, filed on Feb. 3, 2018.

(51) Int. Cl.
G06F 9/4401 (2018.01)
G06F 21/57 (2013.01)
G06F 11/14 (2006.01)
G06F 9/445 (2018.01)
G06F 12/0802 (2016.01)

(52) U.S. Cl.
CPC ............ *G06F 9/4401* (2013.01); *G06F 21/57* (2013.01); *G06F 21/572* (2013.01); *G06F 9/445* (2013.01); *G06F 9/4406* (2013.01); *G06F 11/1417* (2013.01); *G06F 12/0802* (2013.01); *G06F 2212/222* (2013.01); *G06F 2221/033* (2013.01)

(58) Field of Classification Search
CPC .. G06F 9/4401; G06F 9/4406; G06F 12/0802; G06F 21/572; G06F 11/1417; G06F 2212/222; G06F 9/445; G06F 21/57; G06F 2221/033
USPC ............................................... 713/2; 711/118
See application file for complete search history.

(56) References Cited

U.S. PATENT DOCUMENTS

| 6,539,456 B2 * | 3/2003 | Stewart | G06F 9/4401 711/113 |
| 9,710,283 B2 * | 7/2017 | He | G06F 9/4401 |
| 9,720,698 B2 | 8/2017 | Steele | |
| 2007/0260869 A1 * | 11/2007 | Dade | G06F 9/4401 713/2 |
| 2009/0077368 A1 * | 3/2009 | Depta | G06F 9/4401 713/2 |
| 2013/0042098 A1 * | 2/2013 | Baik | G06F 9/4418 713/2 |
| 2014/0337609 A1 * | 11/2014 | Steele | G06F 9/4401 713/2 |
| 2015/0339195 A1 * | 11/2015 | Yang | G06F 11/1417 714/6.12 |
| 2016/0314002 A1 * | 10/2016 | Khatri | G06F 9/4403 |

(Continued)

*Primary Examiner* — Ji H Bae
(74) *Attorney, Agent, or Firm* — McCarter & English, LLP; John S. Curran

(57) ABSTRACT

A system and method for boot speed optimization is discussed. Uncompressed copies of UEFI firmware volumes and OS boot loader files stored on a portion of an NVDIMM are used during a boot sequence in a computing platform. The cached copies on the NVDIMM are used during the boot sequence after a successful validation check is performed to provide faster boots of the computing platform.

14 Claims, 6 Drawing Sheets

(56) References Cited

U.S. PATENT DOCUMENTS

2018/0275731 A1* 9/2018 Engler ................ G06F 12/0246
2019/0096489 A1* 3/2019 Mosiolek ............... G11C 5/144

* cited by examiner

SYSTEM AND METHOD FOR BOOT SPEED OPTIMIZATION USING NON-VOLATILE DUAL IN-LINE MEMORY MODULES

RELATED APPLICATION

This application claims the benefit of, and priority to, U.S. Provisional Patent Application No. 62/626,038, filed Feb. 3, 2018, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto non-volatile Read-Only Memory (ROM) modules including, but not limited to, ROM, PROM, EPROM, EEPROM, and Flash memory (collectively referred to hereafter as "ROM"). A characteristic of non-volatile memory is that it retains data when power is withdrawn. In contrast, volatile memory loses data in the absence of power. For example, volatile Random Access Memory (RAM) loses its data when a computer is shut down while the various types of non-volatile ROM maintain their data through shutdown and re-boot. Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). The UEFI specification describes a set of tools by which a computing device can move in an organized fashion from the power-applied state to fully operational. The specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in Read Only Memory (ROM). In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

Non-volatile Dual In-line Memory Modules (NVDIMMs) include both volatile Dynamic Random Access Memory (DRAM) (like a traditional DIMM) as well as slower but less expensive non-volatile flash memory and are being increasingly deployed in various computing platforms. The Joint Electron Device Engineering Council (JEDEC) provides standards for computer memory. JEDEC defines three types of NVDIMMs: NVDIMM-N, NVDIMM-F and NVDIMM-P. On an NVDIMM-N each byte of DRAM is backed by flash memory. An NVDIMM-F is a DIMM that is flash and the flash is block-accessible through a command buffer. An NVDIMM classified as NVDIMM-P is a combination of the two other types of NVDIMMs and includes both memory mapped Flash and memory mapped DRAM allowing for byte or block addressability.

BRIEF SUMMARY

Embodiments of the present invention provide a system and method for increasing the boot speed of a computing platform by creating uncompressed copies of UEFI firmware volumes and OS boot loader files needed for a boot sequence in a portion of an NVDIMM-N or NVDIMM-P. Subsequent requests to access these files on the original media on which the instructions are ordinarily stored are intercepted and the files on the NVDIMM are retrieved instead after verification that the files on the NVDIMM remain valid.

In one embodiment a computing platform-implemented method for boot speed optimization using firmware and non-volatile memory modules includes initiating a boot sequence for a computing platform equipped with firmware and one or more processors. The computing platform includes one or more Non-Volatile Dual In-line Memory Modules (NVDIMMs). The method also includes identifying with the firmware a need during the boot sequence for a firmware volume or OS boot loader file that is stored on a boot flash device or other location and determining whether a copied version of the firmware volume or OS boot loader file is stored on the one or more NVDIMMs and is in a valid condition. Additionally, when it is determined that the copied version of the firmware volume or OS boot loader file is stored on the one or more NVDIMMs and is in a valid condition, the method uses the copied version of the firmware volume or OS boot loader file stored on the NVDIMM instead of the firmware volume or OS boot loader file stored on the boot flash device or other location during the boot sequence.

In another embodiment, a computing device is configured for boot speed optimization using firmware and non-volatile memory modules. The computing device includes at least one processor, an operating system, one or more Non-Volatile Dual In-line Memory Modules (NVDIMMs), and firmware. The firmware when executed initiates a boot sequence for the computing device and identifies a need during the boot sequence for a firmware volume or OS boot loader file that is stored on a boot flash device or other location. The firmware when executed also determines whether a copied version of the firmware volume or OS boot loader file is stored on the one or more NVDIMMs and is in a valid condition. Additionally the firmware when executed uses, when it is determined that the copied version of the firmware volume or OS boot loader file is stored on the one or more NVDIMMs and is in a valid condition, the copied version of the firmware volume or OS boot loader file stored on the NVDIMM instead of the firmware volume or OS boot loader file stored on the boot flash device or other location during the boot sequence.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention create and utilize uncompressed copies of UEFI firmware volumes and OS boot loader files stored on a portion of an NVDIMM during a boot sequence in a computing platform. The cached copies on the NVDIMM are used during the boot sequence after a successful validation check is performed to provide faster boots of the computing platform.

As noted above, during a typical boot sequence for a computing platform firmware volumes and OS boot loader files stored in a flash boot device or other location may be required for the boot sequence. More particularly, the boot sequence may execute UEFI firmware stored in firmware volumes to initialize the computing device and prepare it for operation. A firmware volume is a file system defined for storage directly in a ROM part. There may be separate volumes holding different portions of the boot sequence code (e.g. PXE vs. DXE). The firmware volumes may be nested and include additional firmware volumes. Conventionally, the firmware volumes may be stored as compressed volumes to save space in the flash device. During a conventional boot sequence, these compressed volumes stored on the flash device must be decompressed before use which represents an additional time delay. At the end of the boot sequence, one or more OS boot loader files responsible for loading an operating system into memory are executed and then the firmware exits the boot sequence. The OS boot loader files may be stored on (and retrieved from) a hard drive or other location and may therefore add additional access time for their retrieval to the boot sequence.

Figure 1:
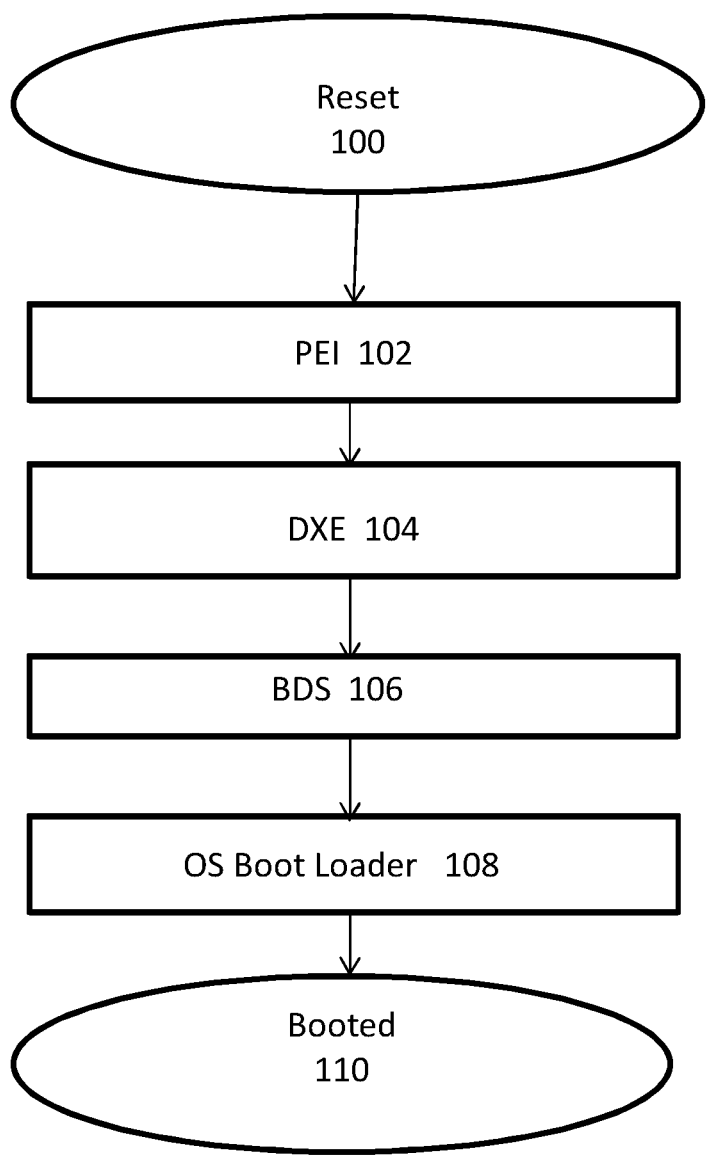
FIG. 1 (prior art) depicts an exemplary sequence of steps performed by UEFI-compliant firmware during a conventional boot sequence.

FIG. 1 (prior art) depicts an exemplary sequence of steps performed by UEFI-compliant firmware during a conventional boot sequence. The standard UEFI boot sequence, as described in the Platform Initialization (PI) specification, is shown in steps 100-110 in FIG. 1. The UEFI Specification technically only covers only a portion of the depicted sequence (approximately between steps 106-110 in FIG. 1) and some platforms cut out the early phases (PEI, Reset). However, the sequence depicted is a typical one for a conventional UEFI boot sequence. The boot sequence begins with reset (step 100) where the computing device begins execution at the CPU's reset vector in the PI security (SEC) phase. After the firmware discovers the location of the first firmware volume and validates its integrity, the sequence jumps into the Pre-EFI Initialization (PEI) phase (step 102). The PEI phase continues until system memory is discovered and the boot mode determined. Once the PEI phase has completed, the Driver Execution Environment (DXE) phase begins which initializes the UEFI environment (step 104). Following the initialization of the complete set of UEFI services, the Boot Device Selection (BDS) phase (step 106) begins. The purpose of the BDS phase is to locate the boot device(s), load the OS boot loader executable from the selected boot device into memory and begin execution of the OS boot loader executable (step 108). The OS boot loader executable takes control of the system from the firmware and then launches the OS environment, at which time the system is considered to have booted (step 110).

Embodiments of the present invention utilize copied firmware volumes needed for a boot sequence that are stored on an NVDIMM instead of the typical boot flash device. Embodiments may also utilize copies of OS boot loader files needed for a boot sequence that are stored on an NVDIMM instead of a hard drive or other location. In one embodiment, for UEFI firmware volumes, during power-on of a computing platform, a detection is made by the platform firmware as to whether there is a valid copy of the firmware volume already in existence on an NVDIMM controllable by the firmware. In one embodiment, the detection is made during the SEC phase of the boot sequence. In another embodiment, the detection is made during the PEI phase. In an alternative embodiment, the detection may occur before reset by a secondary controller, such as a Management Engine (ME) or a Baseboard Management Controller (BMC) that controls the reset. The detection checks for an uncompressed copy of the needed firmware volume and then passes that information or alters the flash configuration so that it would directly execute out of the uncompressed version. The firmware also performs a check to determine whether cache records on the NVDIMM are invalid, and whether the firmware has been updated since the last boot sequence. If none of these situations are true, the firmware volumes in the NVDIMM are used during the boot sequence instead of the firmware volume in the normal boot flash device or other ROM module. However, if any of these situations are true, i.e. the copy of the firmware volume does not exist on the NVDIMM, the cache records on the NVDIMM are invalid, or the platform firmware has been updated since the last boot sequence, then the normal boot process for the computing platform is followed and the firmware volume is retrieved from its original conventional location (i.e. the flash device or other ROM location from which the firmware volume is ordinarily retrieved). Additionally, subsequent to the detection of at least one of these events being determined as true, an uncompressed copy of the firmware volumes is made and copied to an NVDIMM partition from the platform's on-board flash device or other ROM location. A record of the creation of the firmware volume copy on the NVDIMM is made at a location available to the firmware. In an exemplary embodiment this creation of the firmware volume copy may occur by the firmware copying the firmware volume prior to operating system hand-off at the end of the boot sequence (ready-to-boot, exit-boot-services, etc.). In another embodiment, the copying may occur using an OS application, shell application or drive after the operating system has taken control at the end of the boot sequence.

On a subsequent boot, following the copying of the firmware volumes to the NVDIMM, the firmware volumes in the NVDIMM are used instead of the firmware volume in the boot flash device or other ROM location. This can be done for all firmware volumes except the ones used prior to memory initialization (and thus NVDIMM initialization) being complete. Since accessing the NVDIMM is faster than retrieving the firmware volume from the on-board flash device or other ROM, the subsequent boots of the computing platform that utilize the copied firmware volume will be faster. Further, the copies of the firmware volumes that are stored on the NVDIMM are stored in an uncompressed manner resulting in their not needing to be decompressed before use and thus saving additional time.

In an embodiment, platform firmware determines the validity of the cached copy of the firmware volume on the NVDIMM prior to its use. The cached copy of the firmware volume can be marked invalid as a result of a flash update taking place that alters the original firmware volume. The copied firmware volume may also be marked invalid through a user action such as a setup command, through a flash utility or through the detection of a flash device being replaced. It will be appreciated that a number of mechanisms, including the setting of a flag, may be used to indicate that the cached copy of the firmware volume is no longer valid.

Figure 2:
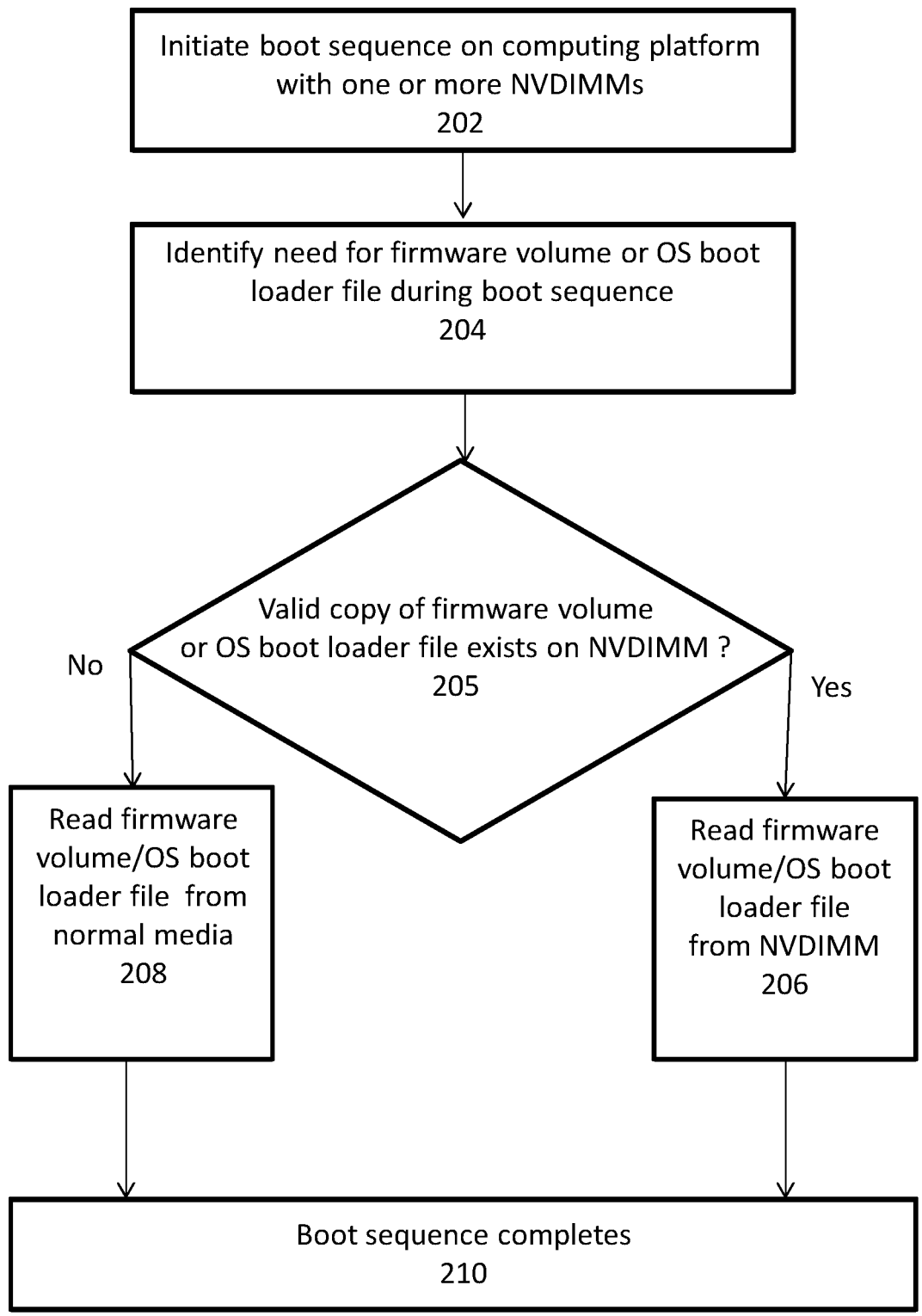
FIG. 2 depicts an exemplary sequence of steps in a computing platform to identify and retrieve a valid stored copy of a firmware volume or OS boot loader file on an NVDIMM during a boot sequence in an exemplary embodiment.

FIG. 2 depicts an exemplary sequence of steps in a computing platform to identify and retrieve a valid stored copy of a firmware volume or OS boot loader file on an NVDIMM during a boot sequence in an exemplary embodiment. The sequence begins with the firmware initiating a boot sequence for the computing platform (step 202). The firmware identifies a need for a firmware volume or OS boot loader file in the upcoming boot sequence (step 204). The firmware detects whether a valid copy of the needed firmware volume or OS boot loader file exists on the NVDIMM (step 205). For example, the firmware may maintain a record of copied firmware volume locations. If the firmware volume copy or OS boot loader file exists on the NVDIMM (step 205), and is not marked invalid (e.g. because the firmware has been updated since the last boot or the NVDIMM cache is marked invalid), the firmware volume or OS boot loader file is read from the faster NVDIMM to speed the boot sequence (step 206). It should be appreciated that embodiments of the present invention may utilize NVDIMM-N or NVDIMM-P type NVDIMMs but may not use NVDIMM-F type NVDIMMs as NVDIMM-F only allows block access and so isn't suitable for direct execution. If the firmware volume or OS boot loader file copy does not exist on the NVDIMM (or is marked invalid) (step 205) then the normal boot process is followed and the firmware volume or OS boot loader file is read from the original location (e.g. the on-board flash device or other location) (step 208). Subsequently to the reading of the firmware volume, a copy of the uncompressed firmware volume or OS boot loader file is made to the NVDIMM partition. As noted above, this copying may occur before or after the completion of the boot sequence. This process may iterate as additional firmware volumes and/or OS boot loader files are identified as necessary for the boot sequence. Following the reading and execution of all of the required firmware volumes and OS boot loader files the boot sequence completes and control of the computing platform is handed by the firmware to the now loaded operating system (step 210).

Figure 3:
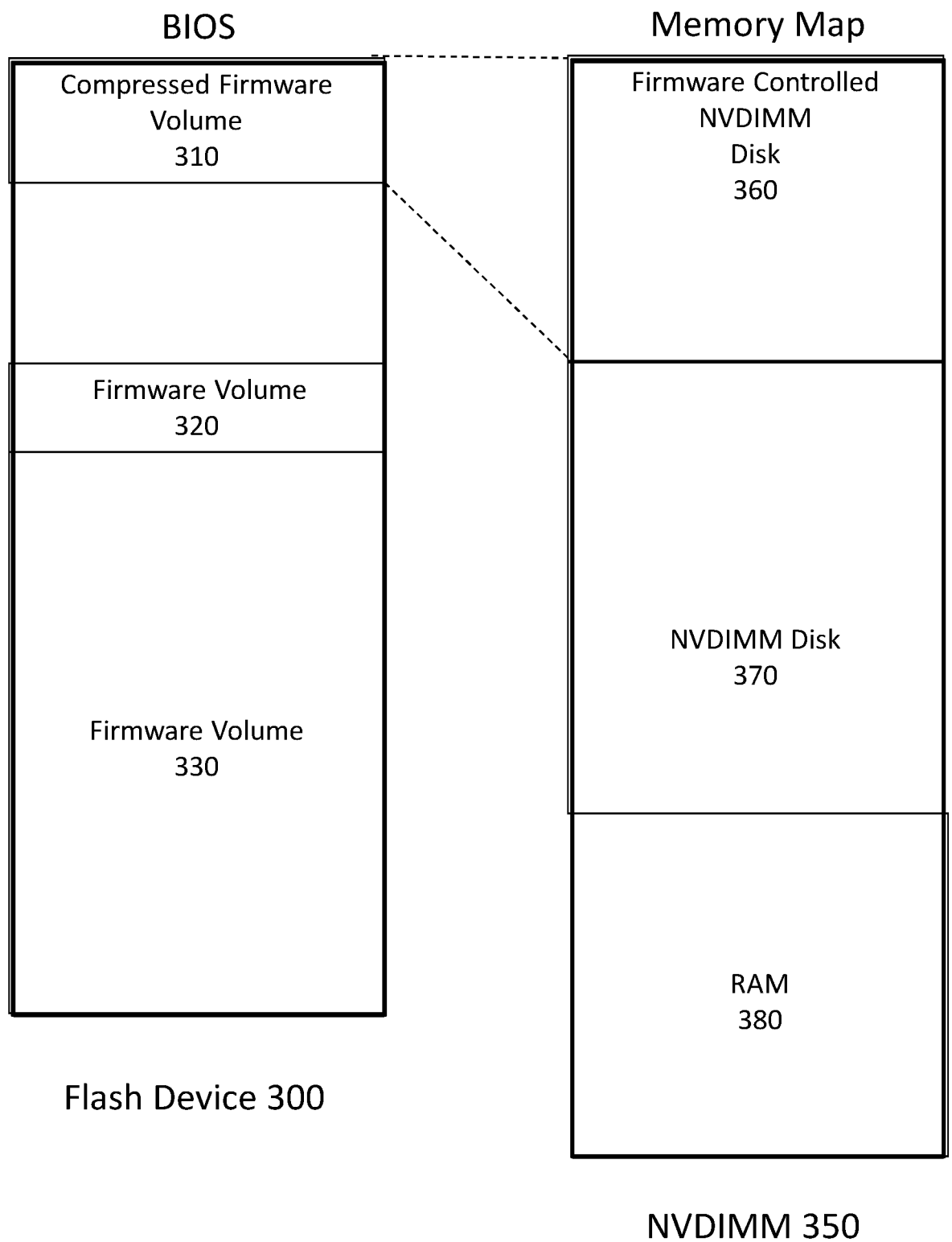
FIG. 3 depicts an exemplary memory map on a computing platform in an exemplary embodiment.

FIG. 3 depicts a memory map on a computing platform in an exemplary embodiment. A flash device 300 includes compressed firmware volume 310 and firmware volumes 320, 330. Embodiments identify compressed volume 310 as necessary for the boot sequence and copy the firmware volume in an uncompressed form to a firmware controlled NVDIMM disk 360 on NVDIMM 350. NVDIMM 350 may also include additional NVDIMM disk 370 and RAM 380.

In an embodiment, during the next boot sequence following copying of the firmware volume, a validity check is performed by the platform firmware on the copied uncompressed version of firmware volume 310 stored on NVDIMM 350 in NVDIMM disk 360. As discussed above, if the copied firmware volume passes the validity check it may be used during the boot sequence instead of compressed firmware volume 310 on flash device 300 in order to speed booting of the computing platform.

In an embodiment, for OS boot loader files, read accesses to file systems are tracked based on file path and UEFI device path prior to exit-boot-services being called during a boot sequence. If a write access is made to an OS boot loader file, then the cached version of that file on the NVDIMM is marked as invalid (since the copy is no longer up to date). For read requests, if the file and device path match a previously cached version of the file on the NVDIMM, the file on the NVDIMM is used instead of the one from the boot device. If the file and device path do not match a cached version on the NVDIMM, then the file is accessed from the original media. Optionally, when the original media is accessed (and thus the media is spun up), the partition information or time/date stamps of the cached versions of files on the NVDIMM can be compared against those on the original physical media and, if they differ, the cached versions on the NVDIMM of all file versions associated with that device path are cleared (and the original files are used instead).

Figure 4:
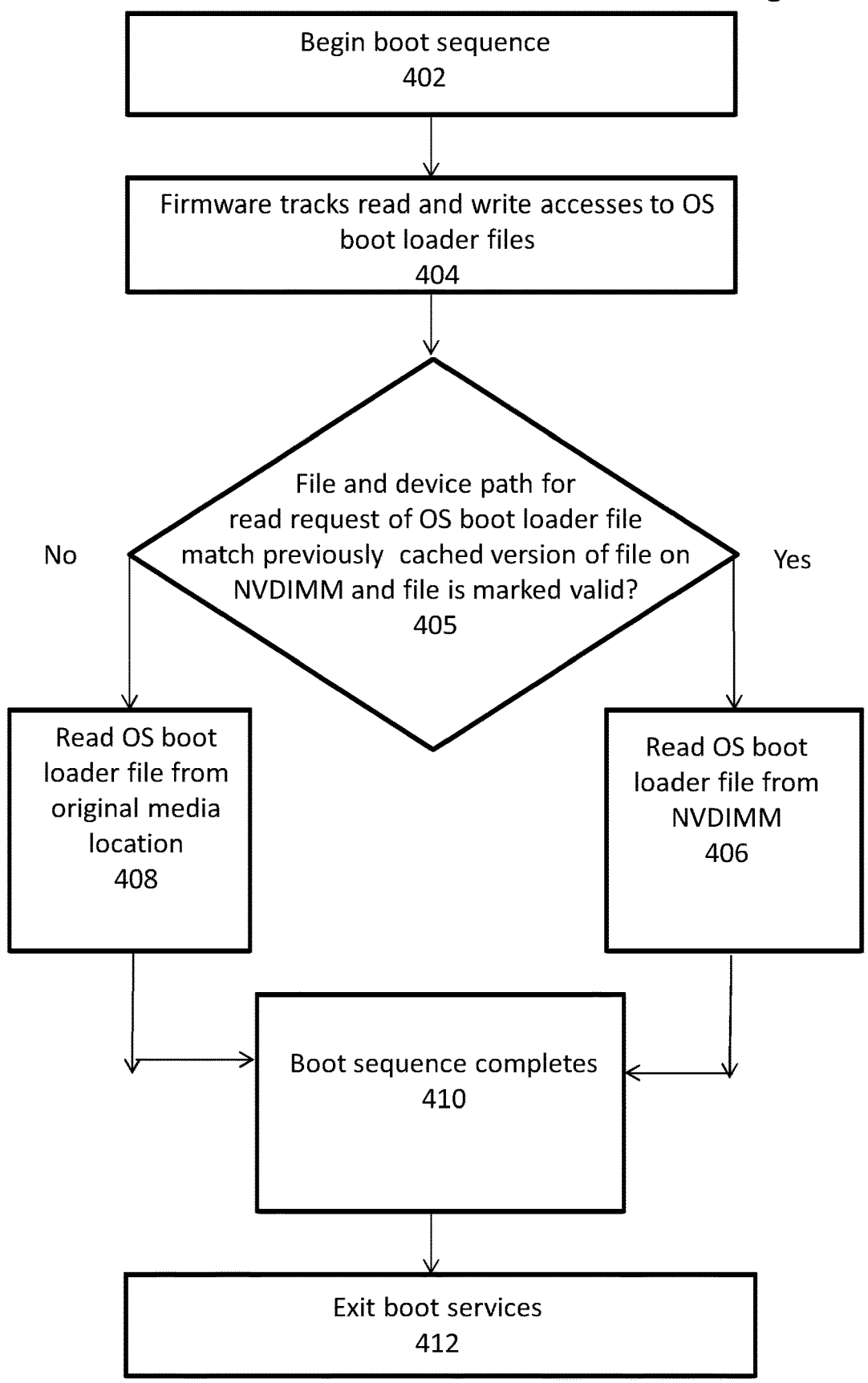
FIG. 4 depicts an exemplary sequence of steps in a computing platform to identify and retrieve valid stored copies of OS boot loader files on an NVDIMM during a boot sequence in an exemplary embodiment.

FIG. 4 depicts an exemplary sequence of steps in a computing platform to identify and retrieve valid stored copies of OS boot loader files on an NVDIMM during a boot sequence in an exemplary embodiment. The boot sequence begins (step 402) and the firmware tracks read and write requests to OS boot loader file location(s) (step 404). For read requests, the firmware determines whether a file and device path for the request of an OS boot loader file location match a previously cached version on the NVDIMM and whether that file copy is marked valid (step 305). If a copy exists and is marked valid, the OS boot loader file is read from the NVDIMM to speed the boot sequence (step 406). If a copy of the OS boot loader file doesn't exist on the NVDIMM or is marked invalid, the OS boot loader file is read from the original media location (e.g. a hard drive) (step 408). It will be appreciated that access time to the hard drive is greater than access time to the NVDIMM. If a valid copy of the OS boot loader file doesn't exist, after the original media is read, the OS boot loader file may be copied to the NVDIMM before or after the end of the current boot sequence for use during the next boot sequence. Subsequently the boot sequence completes (step 410) and, exit boot services is called (step 412).

In one embodiment, if the disk is changed or a physical-presence or a case-opening detected signal (or other signal) is identified, the cache for the related device paths are assumed to be invalid. The cache may also be manually invalidated (by setup command or an OS utility) or whenever the firmware is updated. For example, a utility that updates the boot partition may clear the cached versions.

Figure 5:
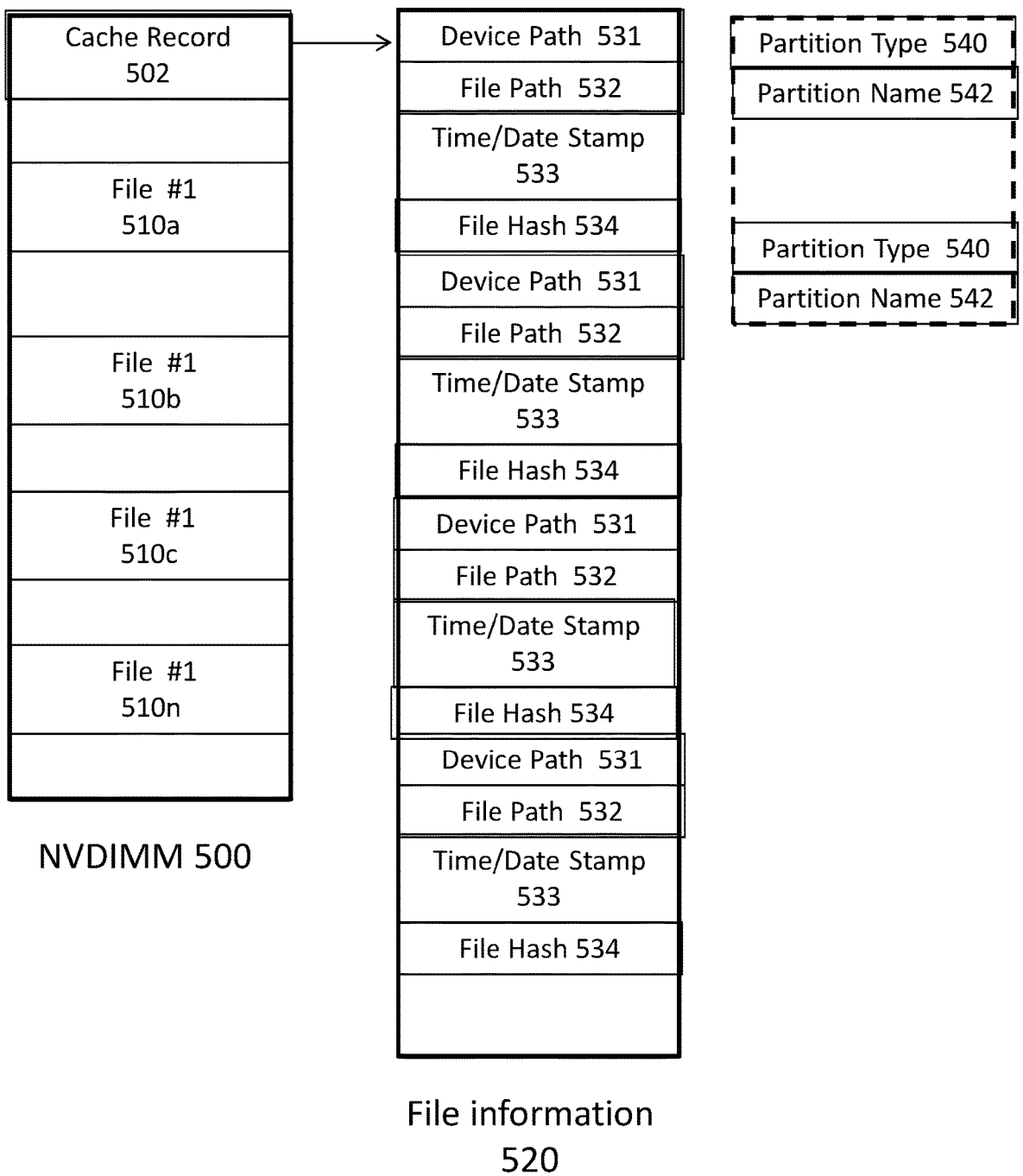
FIG. 5 illustrates information stored in cached records on an NVDIMM that can be used to verify the validity of the file before retrieval in an exemplary embodiment.

The NVDIMM area used in an embodiment may be marked as reserved memory, or it may also be treated as a RAM disk (as described in the UEFI specification) with a specific partition type. FIG. 5 illustrates information stored in cached records on an NVDIMM 500 that can be used to verify the validity of the file before retrieval in an exemplary embodiment. For example, NVDIMM 500 may include a cache record 502 holding information about multiple files 510a, 510b, 510c and 510n. Cache record 502 may include file information 520 for each of the files including information for device path, 531, file path 532, time/date stamp 533 and file hash 534. As noted above, sections of NVDIMM 500 may also be treated as a RAM disk with a partition type 540 and partition name 542. As discussed above the firmware may verify the validity of the cached copy of the file on the NVDIMM by comparing partition information or time and date stamps of the original media files after the media is accessed and/or spun up against the information for the NVDIMM cached versions of the files.

Figure 6:
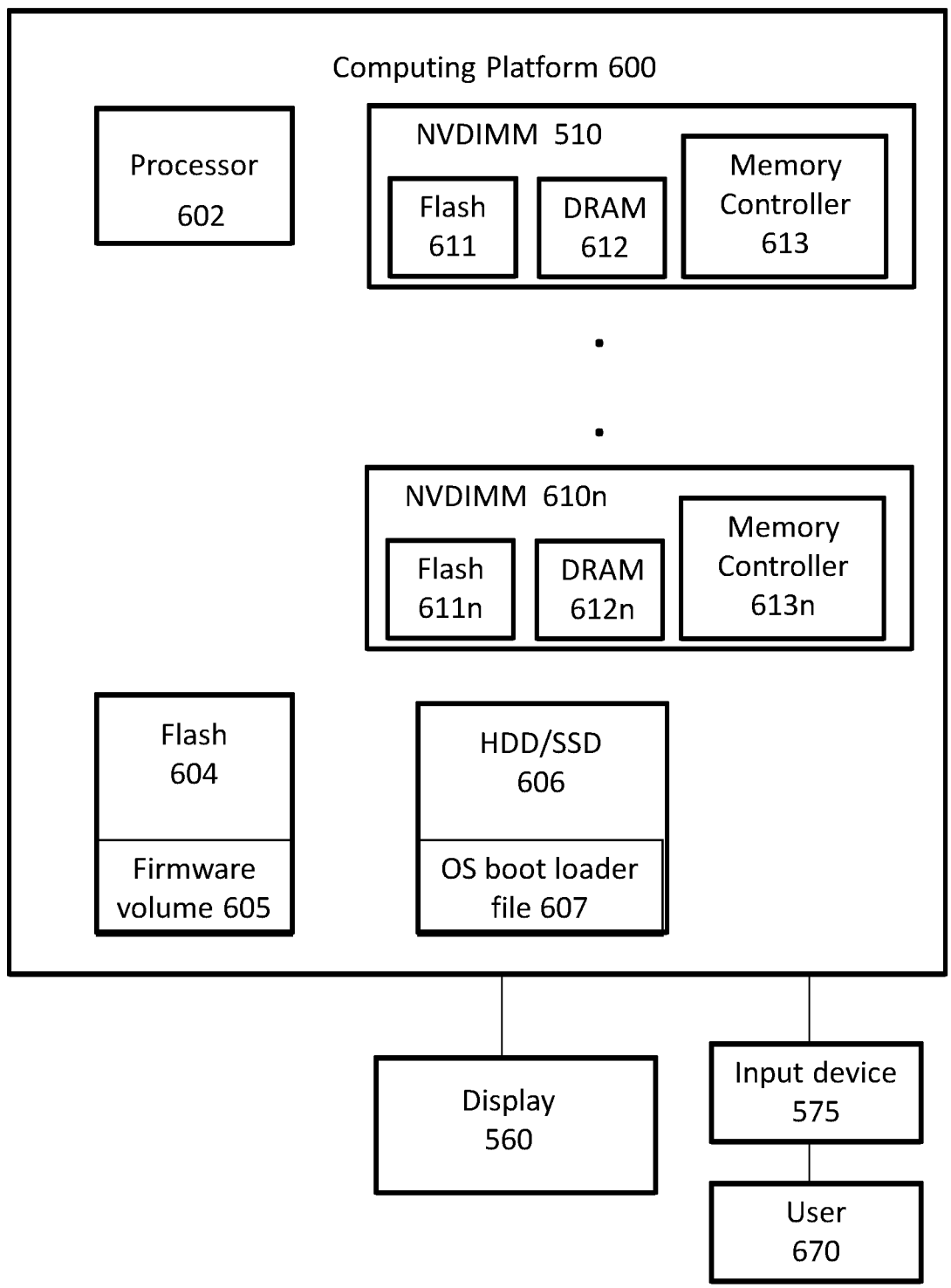
FIG. 6 depicts an exemplary computing platform suitable for practicing an exemplary embodiment.

FIG. 6 depicts an exemplary computing platform suitable for practicing an exemplary embodiment. The computing platform 600 includes one or more processors 602 and one or more NVDIMMs 610 to 610n. Each of the NVDIMMs 610 to 610n respectively may include Flash memory 611 to 611n. The NVDIMMs 610 to 610n further respectively include DRAM 612 to 612n and memory controller 613 to 613n. Computing platform 600 also includes flash 604 or other ROM locations holding one or more firmware volumes 605 and a hard drive or solid state drive 606 or other location holding one or more OS boot loader files 607. Firmware volume 605 and OS boot loader file 607 may be required during a boot sequence for computing platform 600. A user 670 may access computing platform 600 via input device 675 and may view output from the computing platform on display 660. As discussed herein copies of firmware volume 605 and OS boot loader file 607 may be copied to flash memory 611 to 611n on NVDIMMs 610 to 610n to speed the boot sequence for computing platform 600. Computing platform may be, but is not limited to, a desktop computer, laptop, server, tablet, mobile device, smartphone, or other electronic device equipped with a processor and firmware configured as described herein.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. For example, although the discussion herein discusses only the use of NVDIMMs, the use of other types of non-volatile memory modules in place of, or in addition to, NVDIMMS, should also be considered to be within the scope of the present invention. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing platform-implemented method for boot speed optimization using firmware and non-volatile memory modules:
   initiating a boot sequence for a computing platform equipped with firmware and one or more processors, the computing platform including one or more Non-Volatile Dual In-line Memory Modules (NVDIMMs);
   identifying with the firmware a need during the boot sequence for a firmware volume or OS boot loader file that is stored on a boot flash device or other location;
   determining whether a copied version of the firmware volume or OS boot loader file is stored on the one or more NVDIMMs and is in a valid condition;
   using, when it is determined that the copied version of the firmware volume or OS boot loader file is stored on the one or more NVDIMMs and is in a valid condition, the copied version of the firmware volume or OS boot loader file stored on the one or more NVDIMMs instead of the firmware volume or OS boot loader file stored on the boot flash device or other location during the boot sequence; and
   copying, when it is determined that the copied version of the firmware volume or OS boot loader file is not stored on the one or more NVDIMMs or is not in a valid condition, the firmware volume or OS boot loader file stored on the boot flash device or other location to the one or more NVDIMMs for use in a subsequent boot sequence, the copying performed by an OS application, a shell application or a driver.

2. The method of claim 1, further comprising:
   using, when it is determined that the copied version of the firmware volume or OS boot loader file is not stored on the one or more NVDIMMs or is not in a valid condition, the firmware volume or OS boot loader file stored on the boot flash device or other location instead of the copied version of the firmware volume or OS boot loader file stored on the one or more NVDIMMs during the boot sequence.

3. The method of claim 1 wherein the copied version of the firmware volume is an uncompressed firmware volume or OS boot loader file.

4. The method of claim 1, further comprising:
   determining whether the copied version of the firmware volume or OS boot loader file stored on the one or more NVDIMMs is in a valid condition by checking cache records on the one or more NVDIMMs.

5. The method of claim 1 wherein the determination of whether the copied version of the firmware volume or OS boot loader file stored on the one or more NVDIMMs is in a valid condition is determined by whether the firmware has been updated since a last boot sequence.

6. A non-transitory medium holding computing device-executable instructions for boot speed optimization using firmware and non-volatile memory modules, the instructions when executed causing at least one computing device equipped with firmware and one or more processors to:
   initiate a boot sequence for the at least one computing device, the at least one computing device including one or more Non-Volatile Dual In-line Memory Modules (NVDIMMs);
   identify with the firmware a need during the boot sequence for a firmware volume or OS boot loader file that is stored on a boot flash device or other location;
   determine whether a copied version of the firmware volume or OS boot loader file is stored on the one or more NVDIMMs and is in a valid condition;

use, when it is determined that the copied version of the firmware volume or OS boot loader file is stored on the one or more NVDIMMs and is in a valid condition, the copied version of the firmware volume or OS boot loader file stored on the one or more NVDIMMs instead of the firmware volume or OS boot loader file stored on the boot flash device or other location during the boot sequence; and copy, when it is determined that the copied version of the firmware volume or OS boot loader file is not stored on the one or more NVDIMMs or is not in a valid condition, the firmware volume or OS boot loader file stored on the boot flash device or other location to the one or more NVDIMMs for use in a subsequent boot sequence, the copying performed by an OS application, a shell application or a driver.

7. The medium of claim 6, wherein the instructions when executed cause the at least one computing device to:
use, when it is determined that the copied version of the firmware volume or OS boot loader file is not stored on the one or more NVDIMMs or is not in a valid condition, the firmware volume or OS boot loader file stored on the boot flash device or other location instead of the copied version of the firmware volume or OS boot loader file stored on the one or more NVDIMMs during the boot sequence.

8. The medium of claim 6, wherein the copied version of the firmware volume is an uncompressed firmware volume or OS boot loader file.

9. The medium of claim 6, wherein the instructions when executed cause the at least one computing device to:
determine whether the copied version of the firmware volume or OS boot loader file stored on the one or more NVDIMMs is in a valid condition by checking cache records on the one or more NVDIMMs.

10. The medium of claim 6 wherein the determination of whether the copied version of the firmware volume or OS boot loader file stored on the one or more NVDIMMs is in a valid condition is determined by whether the firmware has been updated since a last boot sequence.

11. A computing device configured for boot speed optimization using firmware and non-volatile memory modules, the computing device comprising:
at least one processor;
an operating system;
one or more Non-Volatile Dual In-line Memory Modules (NVDIMMs); and
firmware, the firmware when executed:
initiating a boot sequence for the computing device;
identifying a need during the boot sequence for a firmware volume or OS boot loader file that is stored on a boot flash device or other location;
determining whether a copied version of the firmware volume or OS boot loader file is stored on the one or more NVDIMMs and is in a valid condition;
using, when it is determined that the copied version of the firmware volume or OS boot loader file is stored on the one or more NVDIMMs and is in a valid condition, the copied version of the firmware volume or OS boot loader file stored on the one or more NVDIMMs instead of the firmware volume or OS boot loader file stored on the boot flash device or other location during the boot sequence; and
copying, when it is determined that the copied version of the firmware volume or OS boot loader file is not stored on the one or more NVDIMMs or is not in a valid condition, the firmware volume or OS boot loader file stored on the boot flash device or other location to the one or more NVDIMMs for use in a subsequent boot sequence, the copying performed by an OS application, a shell application or a driver.

12. The computing device of claim 11, wherein the copied version of the firmware volume is an uncompressed firmware volume or OS boot loader file.

13. The computing device of claim 11, wherein the firmware when executed further:
determines whether the copied version of the firmware volume or OS boot loader file stored on the one or more NVDIMMs is in a valid condition by checking cache records on the one or more NVDIMMs.

14. The computing device of claim 11, wherein the firmware when executed further:
uses, when it is determined that the copied version of the firmware volume or OS boot loader file is not stored on the one or more NVDIMMs or is not in a valid condition, the firmware volume or OS boot loader file stored on the boot flash device or other location instead of the copied version of the firmware volume or OS boot loader file stored on the one or more NVDIMMs during the boot sequence.

* * * * *